April 9, 1963
C. BOUNIN
3,084,801
PROCESS AND APPARATUS FOR EVACUATING
HEAVY SOLIDS FROM A DECANTER
Filed Nov. 18, 1958
5 Sheets-Sheet 1
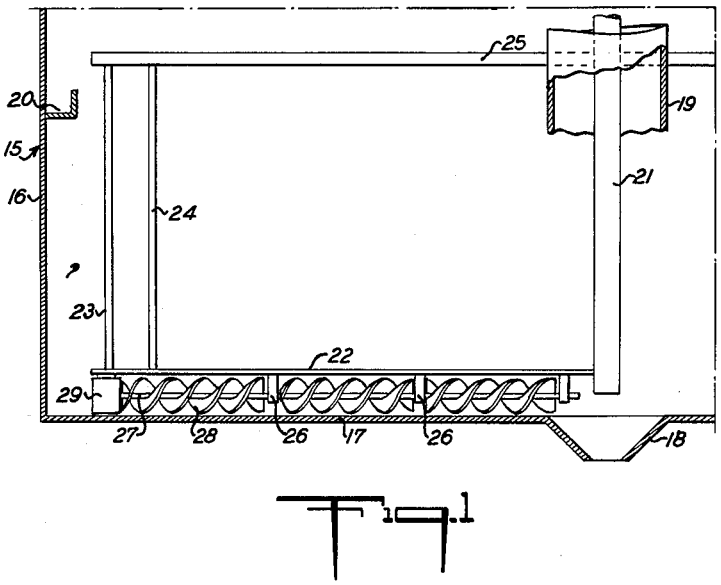
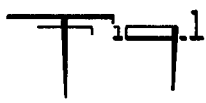
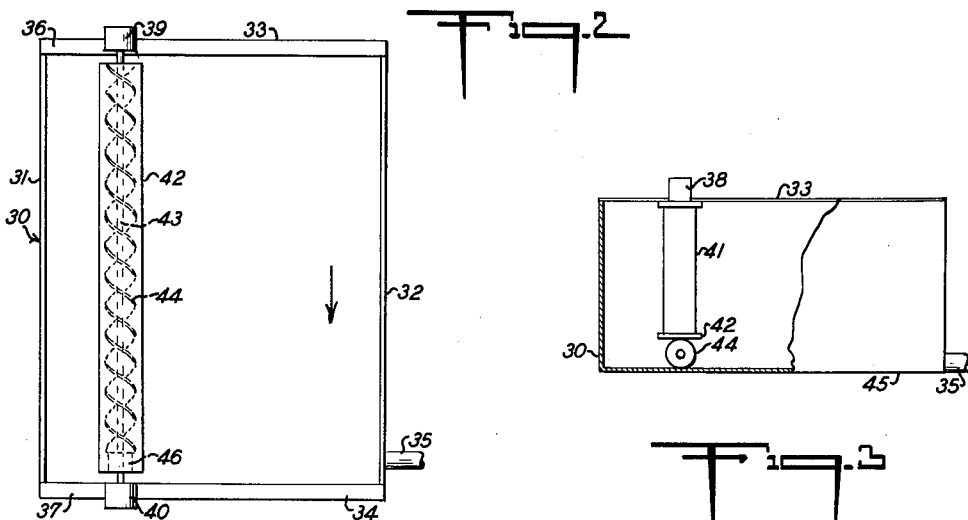
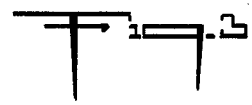
INVENTOR
CLAUDE BOUNIN
BY
ATTORNEYS

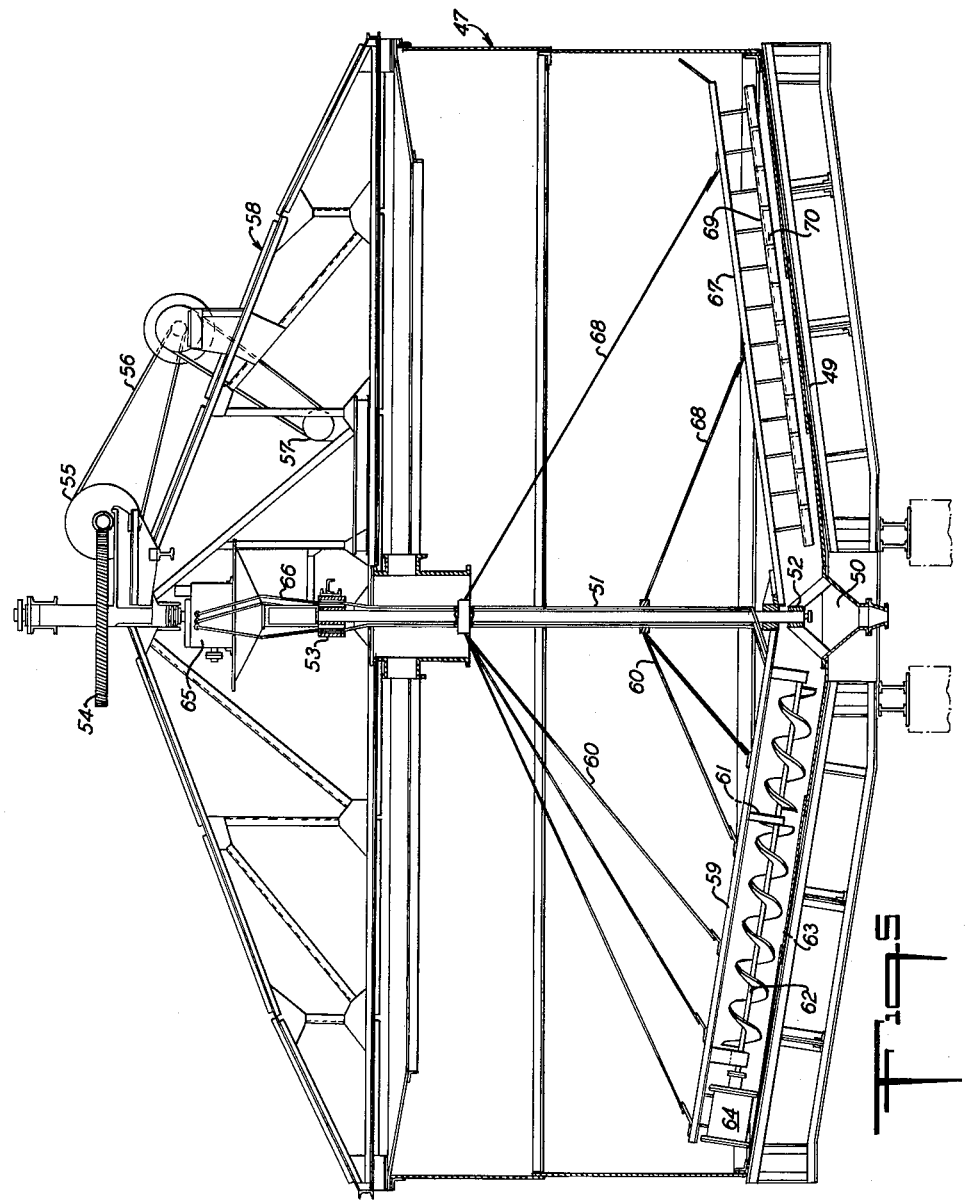

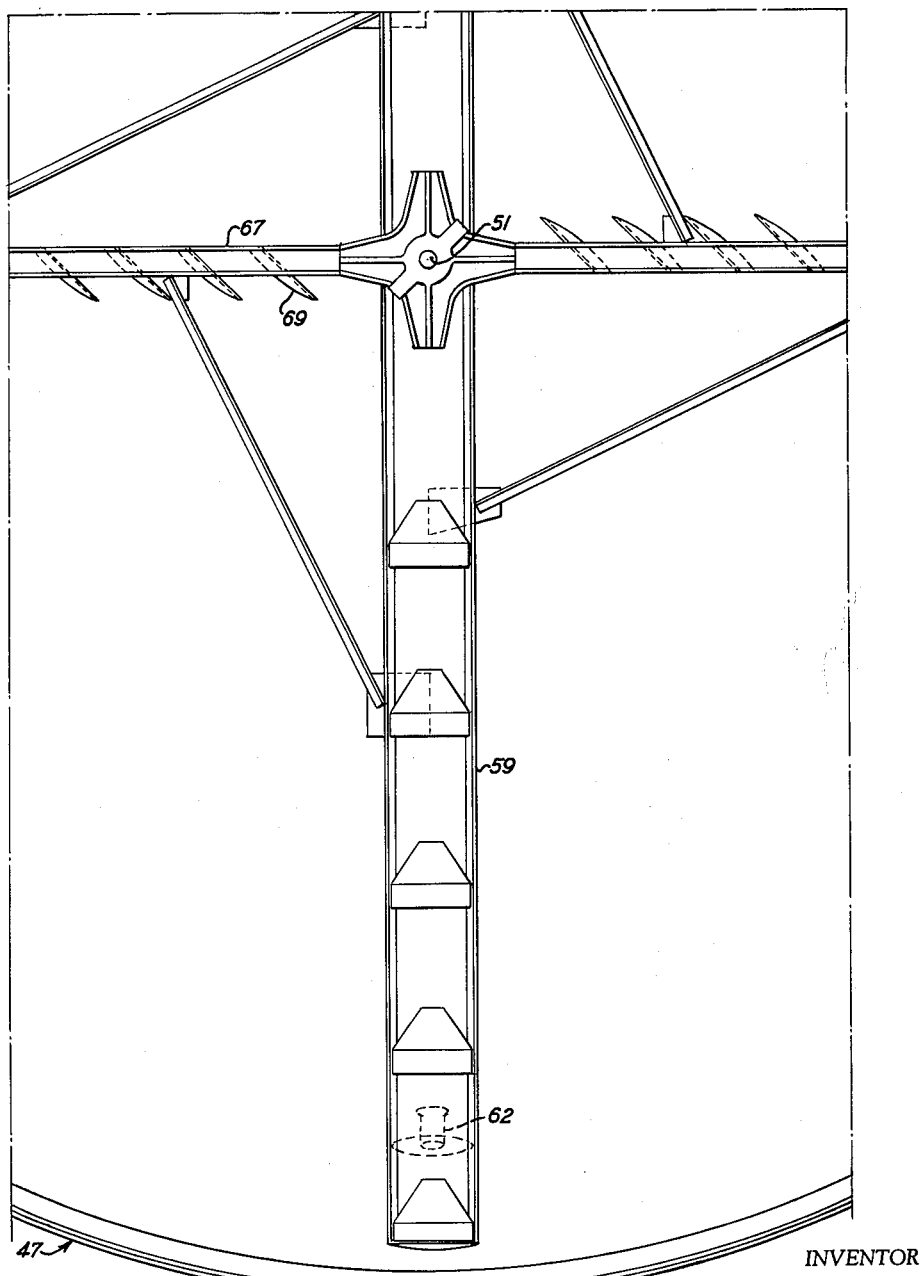

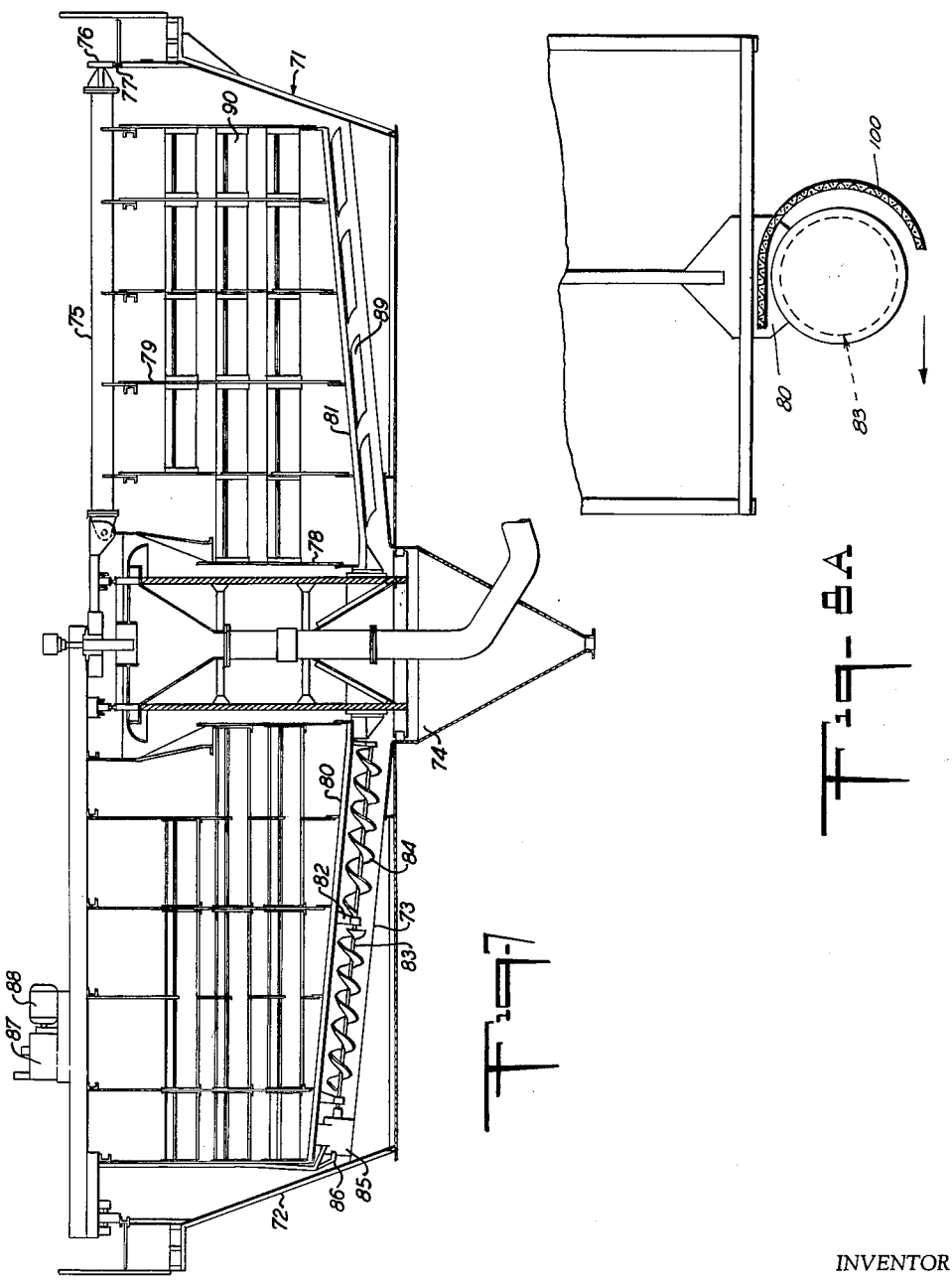

April 9, 1963
C. BOUNIN
3,084,801
PROCESS AND APPARATUS FOR EVACUATING
HEAVY SOLIDS FROM A DECANTER
Filed Nov. 18, 1958
5 Sheets-Sheet 5
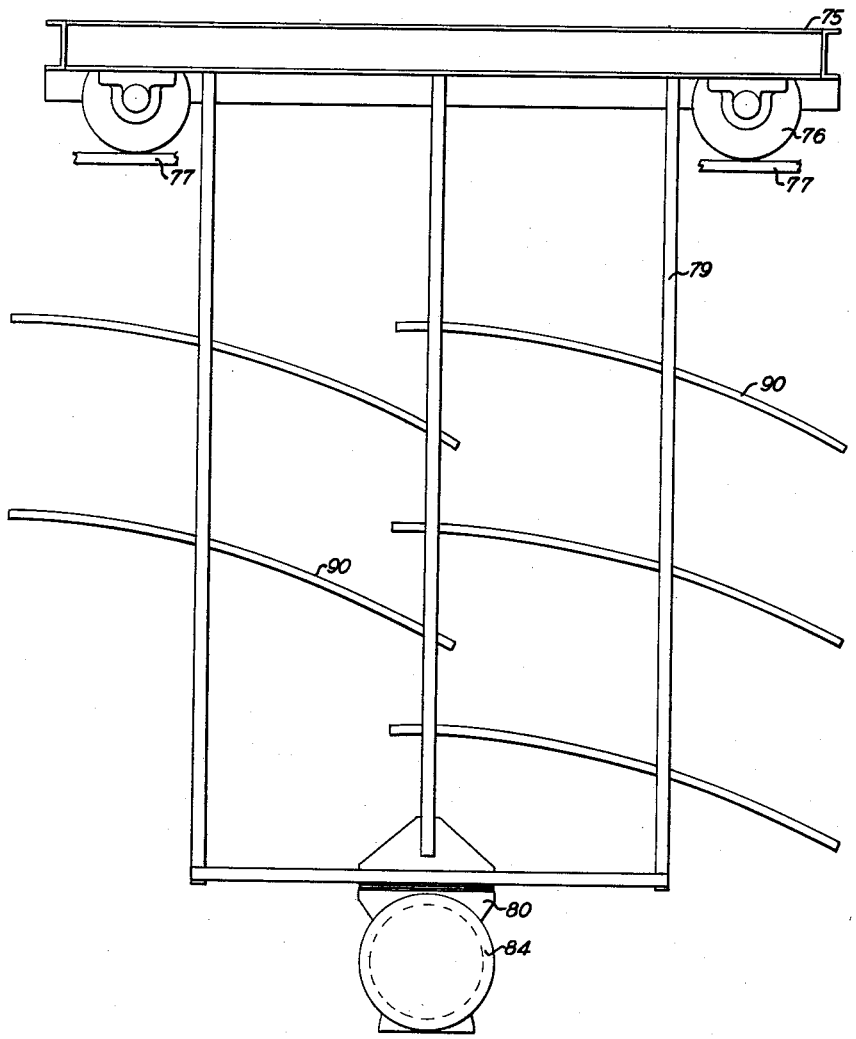
INVENTOR
CLAUDE BOUNIN
ATTORNEYS

United States Patent Office 3,084,801
Patented Apr. 9, 1963

3,084,801
PROCESS AND APPARATUS FOR EVACUATING
HEAVY SOLIDS FROM A DECANTER
Claude Bounin, Paris, France, assignor to Deka S.A.,
Geneva, Switzerland, a company of Switzerland
Filed Nov. 18, 1958, Ser. No. 774,731
Claims priority, application France Nov. 21, 1957
3 Claims. (Cl. 210—528)

This invention relates to the treatment of materials and more particularly to an apparatus for separating heavy solids from a liquid suspension and for evacuating the heavy solids from the apparatus.

Heretofore, numerous types of decanters for separating solids from a liquid suspension have been proposed and utilized and the majority of these devices include a tank for receiving a liquid suspension of solids together with means for withdrawing solid-free liquid adjacent the top of the tank and means adjacent the bottom of the tank for withdrawing solids which have been separated from the liquid suspension. In these devices, there are formed, over the bottom of the tank, a succession of layers the density of which increases downwardly, the lowermost layer being that in which the solids content of the suspension is a maximum. Most of these prior art devices incorporate some sort of raking or scraping means for moving solids resting on the bottom of the tank inwardly toward the means for withdrawing the solids. These prior art devices however do not operate satisfactorily for removing the solids in the lowermost layer on the bottom of the tank. In the prior art devices the raking or scraping means tended to merely move the heavy solids along the bottom of the tank without forcing the same into the withdrawal means with the result that the material withdrawn had a density smaller than the density of the lowermost layer. As a result, the said lowermost layer tended to build up until it was necessary to cease operation of the apparatus and clean the tank by means other than that provided for this purpose during normal operation of the decanter.

It is accordingly an object of the invention to provide an apparatus for evacuating primarily the solids of the lowermost layer from the bottom of a decanter in which means is provided for directly engaging and moving such solids along the bottom of the decanter toward and into a means for withdrawing such solids.

A further object of the invention is the provision of an apparatus for evacuating solids from a decanter which includes the provision of a helical conveyor (spiral screw, propeller . . . etc.) which rotates about its own axis to move the solids axially of the conveyor and in which such conveyor is traversed over the bottom of the decanter to shift the path of movement of the solids thereby moving all of the heavy solids toward and into a means for withdrawing the same.

Another object of the invention is the provision of an apparatus for evacuating heavy solids from a decanter in which such decanter may be provided with a circular tank or with a generally rectangular tank.

A further object of the invention is the provision of an apparatus for evacuating heavy solids from a decanter in which there is utilized a helical conveyor mounted for rotation about its own axis and mounted for traversal over the surface of the bottom of the tank and in which a motor is provided directly connected to the helical conveyor for driving the same.

A still further object of the invention is the provision of an apparatus for evacuating heavy solids from a decanter in which a helical conveyor is utilized to move solids along the bottom of the decanter toward a withdrawing means and in which any desired number of such helical conveyors may be utilized depending upon the particular requirements.

Another object of the invention is the provision of an apparatus for evacuating heavy solids from a decanter in which a helical conveyor is utilized to move such solids toward a withdrawing means and in which additional means in the form of angularly disposed vanes are provided to accelerate precipitation of solids from a liquid suspension.

Further objects and advantages of the invention will be apparent from the following description taken in conjunction with the accompanying drawings wherein:

FIG. 1 is a diagrammatic fragmentary view partly in elevation and partly in cross section and showing a circular tank together with a spiral conveyor for moving solids along the bottom of the tank toward a withdrawal means;

FIG. 2 is a fragmentary bottom plan view of the spiral conveyor shown in FIG. 1;

FIG. 3 is a diagrammatic view partly in side elevation and partly in cross-section and illustrating a rectangular type decanter incorporating the principle of this invention;

FIG. 4 is a top plan view of the decanter shown in FIG. 3 and showing the particular arrangement of the spiral conveyor;

FIG. 5 is a longitudinal sectional view of a circular decanter constructed in accordance with this invention and showing the means for supporting and operating the screw conveyor;

FIG. 6 is a fragmentary top plan view of the arm for supporting the spiral conveyor;

FIG. 7 is a longitudinal sectional view of a slightly modified form of the invention and showing the inclusion of vanes for accelerating the precipitation of solids from a liquid suspension and also showing a modified means for supporting the arms carrying the spiral conveyor;

FIG. 8 is a fragmentary side elevational view showing the manner of supporting the vanes for accelerating the precipitation of solids; and FIGURE 8A is a view similar to FIGURE 8 but illustrating a modified arrangement incorporating a screening member moving with the conveyor.

With particular reference of FIGS. 1 and 2 of the drawings, there is shown diagrammatically a relatively simple form of the present invention in which there is provided a circular tank 15 having a sidewall 16 and a bottom wall 17, the bottom wall being provided at the center thereof with an opening 18 for permitting withdrawal of solids from the tank 15. An inlet 19 is provided at the top of the tank for permitting the introduction of a liquid suspension of heavy solids and a trough or similar means 20 is provided on the interior of the tank 15 adjacent the upper end thereof for permitting the withdrawal of solid-free liquid from the tank.

Rotatably mounted within the tank 15 at the center thereof for rotation about a vertical axis is a post or support means 21 and extending radially outward from the post 21 adjacent the bottom thereof is an arm 22 which may be supported by means of a brace member 24 from a radial arm 25 secured to the post 21 adjacent the upper end of the tank 15.

Rotatably mounted in suitable bearing 26 on the arm 22 is a spiral screw conveyor 27 with the blades 28 of the conveyor 27 disposed in close proximity to the bottom wall 17 of the tank 15. A suitable motor 29 is mounted on the arm 22 and is connected to the conveyor 27 for driving the same. The motor 29 may be of a suitable electrical type which will reversibly operate in a submerged position or may, if desired, be of a fluid pressure type which may be reversibly operated by fluid pressure supplied from a suitable source externally of the tank 15, e.g. through a feeding circuit 23.

In the operation of this form of the invention, means is provided to rotate the post 21 to move the arm 22 and conveyor 27 mounted thereon around the tank 15 and as solids are precipitated from a liquid suspension within the tank 15 and come to rest on the bottom wall 17, such solids are engaged by the blades 28 of the conveyor 27 and are moved toward the outlet or withdrawing means 18 and obviously the path of movement of such solids is continuously moved or changed as the arm 22 and conveyor 27 carried thereby moves around the tank. This operation results in the movements of all precipitated solids from the tank 15 inwardly toward the outlet or withdrawing means 18.

A somewhat modified form of the invention is shown in FIGS. 3 and 4 in which there is provided a generally rectangular tank 30 having side walls 31 and 32 and end walls 33 and 34. A suitable outlet or solids withdrawing means 35 is located in the side wall 32 adjacent the end wall 34.

Tracks 36 and 37 are mounted on the end walls 33 and 34 and these tracks serve to movably support a carriage 38 having rollers 39 and 40 adjacent the ends thereof engaging the tracks 36 and 37 respectively and suspended from the carriage 38 by suitable brace members 41 is a beam 42 under which is rotatably mounted a spiral screw conveyor 43 having blades 44 disposed in close proximity to the bottom wall 45 of the tank 30. A suitable motor 46 is mounted under the beam 42 and serves to drive the conveyor 43.

In the operation of the form of the invention shown in FIGS. 3 and 4, a liquid suspension of heavy solids is introduced into the tank 30 and the solids are precipitated from the suspension to the bottom wall 45 of the tank 30. The spiral conveyor 43 is rotated to move the solids in the direction of the arrow as shown in FIG. 4 and at the same time the carriage 38 is moved between the side walls 31 and 32 of the tank 30 to traverse the conveyor 43 over the entire bottom surface of the tank 30 thereby moving all of the solids deposited thereon to a point adjacent the outlet or withdrawing means 35 through which the solids may pass from the tank 30.

With particular reference to FIGS. 5 and 6, there is shown a somewhat more complex form of the invention in which there is provided a circular tank 47 having a side wall 48 and a bottom wall 49 inclined toward the center, there also being provided an outlet 50 at the center of the tank 47 for permitting withdrawal of precipitated solids therefrom.

A central, vertically disposed to the port means 51 is rotatably mounted on suitable bearings 52 and 53 for rotation about a vertical axis and the support means 51 may be rotated by a suitable worm wheel 54 secured thereto and which in turn is driven by a worm gear from a pulley 55, belt 56 and a suitable power source 57. A suitable super structure 58 may be provided on the upper end of the tank 47 to provide a support for the upper end of the support means 51 and also a suitable support for the various auxiliary mechanisms such as the driving means for the support means 51 and other means to be presently described.

A radial arm 59 is secured to the support means 51 adjacent the lower end thereof and such arm extends outwardly in spaced substantially parallel relation to the bottom wall 49 of the tank 47. The arm 59 may be supported from the support means 51 by suitable tension members 60 secured to the support means 51 and arm 59 at spaced points. Depending from the arm 59 are spaced bearings 61 which serve to rotatably support a spiral screw conveyor 62 with the blades 63 of the conveyor 62 disposed in close proximity to the bottom wall 49 of the tank 47. Also carried by the arm 59 and coupled to the conveyor 62 for driving the same is a reversible fluid pressure motor 64. A suitable source of fluid pressure for operating the motor 64 may be provided in the form of a pump 65 mounted on the support means 51 and the pump 65 may be connected with the motor 64 through suitable conduits 66.

While a fluid pressure motor and power source therefor has been shown and described, it is to be understood that this is for illustrative purposes only and that if desired, an electric motor of the type which will operate submerged beneath water may be substituted for the fluid pressure operated motor 64.

Additional radially disposed arms 67 may be secured to the support means 51 adjacent the lower end thereof and extend outwardly in spaced substantially parallel relation to the bottom wall 49 of the tank 47. These arms may also be supported by suitable tension members 68 connected to the support means 51 and arms 67 at spaced points. Arms 67 may also serve to support spiral conveyors of the type above described if such structure is necessary or desirable but in many instances a single spiral conveyor is all that is necessary and in these cases the additional arms 67 may be provided with rakes or scrapers 69 depending therefrom and providing blades 70 disposed in close proximity to the bottom wall 49 of the tank 47. These scrapers will also operate to move the solids deposited on the bottom wall 49 of the tank 47 toward the outlet or withdrawing means 50.

The operation of this form of the invention is similar to that described above in connection with FIGS. 1 and 2, it being obvious that it is only necessary to drive the spiral conveyor 62 and at the same time, to move the same around the tank 47 by rotation of the support means 51 which will result in moving precipitated solids from the outer portions of the tank 47 toward the center and into the outlet or withdrawing means 50.

With particular reference to FIGS. 7 and 8, there is shown a still further modified form of the invention in which there is provided a circular tank 71 having a side wall 72 and a bottom wall 73 inclined toward the center and terminating in a central outlet or solids withdrawing means 74. An upper framework 75 is supported by rollers 76 engaging a circular track 77 and the framework 75 serves to support a centrally located support means 78. Supported from the framework 75 by a depending framework 79 and by the lower end of the support means 78 are radially extending arms 80 and 81.

The arm 80 is provided with depending bearings 82 which serve to rotatably mount a spiral screw conveyor 83, the blades 84 of which are disposed in close proximity to the bottom wall 73 of the tank 71. Also mounted on the arm 80 is a reversible motor 85 for driving the conveyor 83 and in the event the motor 85 is of the fluid pressure type, the same may be provided with operating fluid through conduits 86 from a pump 87 driven by a motor 88 mounted on the framework 75. However, if desired, the motor 85 may be of the electrical type suitable for operation reversible immersed in water.

The arms 81 may carry scrapers or rakes 89 which engage the solids deposited on the bottom wall 73 of the tank 71 to assist the spiral conveyor 83 in moving such solids toward the center of the tank and into the outlet or withdrawing means 74.

The framework 79 as best shown in FIG. 8 also serves to support a plurality of vertically spaced radially extending angularly disposed vanes 90 which vanes rotate around the tank 71 as the arms 80 and 81 rotate and these vanes 90 tend to accelerate precipitation of solids in a liquid suspension in the tank to promote settling of such solids to the bottom of the tank where the same may be removed by the conveyor 83 and rakes or scrapers 89.

The operation of the form of the invention shown in FIGS. 7 and 8 is similar to that described above in connection with FIG. 5 but in addition the vanes 90 operate to accelerate precipitation of solids and of course, the spiral conveyor 83 operates to move solids toward and into the outlet or withdrawing means 74.

In FIGURE 8A is illustrated a modification in which a screen in the form of a curved steel sheet 100 is connected to the arm 80 and positioned behind the spiral screw conveyor 83 as regards its direction of movement through the tank so as to confine the mud between the screen and the spiral to facilitate its movement toward the central discharge.

An efficient mode of operation of the decanter according to the invention consists in suitably relating the speeds of the two motions of the spiral conveyor so as to equalize the axial rate of discharge of the conveyor with its rate of sweeping.

It will be obvious to those skilled in the art that various changes may be made in the invention without departing from the spirit and scope thereof, and therefore the invention is not limited by that which is shown in the drawings and described in the specification, but only as indicated in the appended claims.

What is claimed is:

1. A combination of a decanter for separating heavy solids from a liquid suspension and apparatus for evacuating said heavy solids from the decanter, said decanter including a circular tank, means for introducing a liquid suspension of heavy solids into said tank, means adjacent the top for withdrawing solid-free liquid from said tank and means at the center of the bottom of said tank for withdrawing heavy solids, said evacuating apparatus including a vertically disposed support means mounted for rotation about the axis of said tank, a plurality of radial arms secured to said support means and extending outwardly in spaced relation above the bottom of said tank, a spiral screw conveyor rotatably mounted under at least one of said arms in close proximity to the upper surface of the bottom of said tank and terminating at the inner end adjacent said withdrawing means, a fluid pressure operated motor coupled to the other end of said conveyor for driving said conveyor, separate drive means for rotating said support means to traverse said conveyor over the entire bottom surface of said tank whereby solids resting on said bottom will be moved inwardly into said withdrawing means, and an upwardly extending framework carried by each arm, there being a plurality of vertically spaced, radially extending, angularly disposed vanes carried by said framework, whereby upon rotation of said arms and framework about the vertical axis of said tank said vanes will serve to urge solids in suspension downwardly thereby accelerating separation of said solids from said suspension.

2. A combination of a decanter for separating heavy solids from a liquid suspension and apparatus for evacuating said heavy solids from the decanter, said decanter including a circular tank, means for introducing a liquid suspension of heavy solids into said tank, means adjacent the top for draining solid-free liquid from said tank and means at the center of the bottom of said tank for withdrawing heavy solids, said evacuating apparatus including a vertically disposed support means rotatably mounted for rotation about the axis of said tank, a plurality of radial arms secured to said support means and extending outwardly in spaced relation above the bottom of said tank, a spiral screw conveyor rotatably mounted under at least one of said arms in close proximity to the upper surface of the bottom of said tank and terminating at the inner end adjacent said withdrawing means, a motor under said one arm and coupled to the outer end of the conveyor for driving said conveyor, separate means for rotating said support means to traverse said conveyor over the entire bottom surface of said tank whereby solids resting on said bottom will be moved inwardly into said withdrawing means, and a plurality of vertically spaced, radially extending, angularly disposed vanes supported above said arms for rotation therewith, whereby upon rotation of said arms about the vertical axis of said tank said vanes will serve to urge solids in suspension downwardly thereby accelerating separation of said solids from said suspension.

3. Apparatus for evacuating solids from the bottom of a decanter having an exit, said apparatus comprising a generally elongated member arranged over a part of the bottom of the decanter so as to be completely submerged in the lowermost layer formed during separation in the decanter, means driving said elongated member so as to sweep said bottom, said elongated member further comprising means rotatably driven about an axis oriented in the direction of its length, separate drive means at one end of said rotatably driven means for rotating the same so as to cause the solids to be moved in the direction of said axis towards the exit from the decanter, said separate drive means comprising a fluid pressure operated motor coupled to said member, pump means supported above the level of the liquid and conduit means connected between said motor and pump means to establish a fluid circuit therebetween so as to rotatably drive said elongated member, and further comprising means also moving together with the elongated member and fixed with relation to the aforesaid axis and constituting a screen adapted to retain the materials within the field of action of said rotatably driven means.

References Cited in the file of this patent

UNITED STATES PATENTS

| | | |
|---|---|---|
| 1,299,872 | Traylor | Apr. 8, 1919 |
| 1,767,695 | Morrell et al. | June 24, 1930 |
| 1,828,268 | Wilkes | Oct. 20, 1931 |
| 1,938,894 | Darby et al. | Dec. 12, 1933 |
| 2,202,475 | Wileman | May 28, 1940 |
| 2,292,855 | Wileman | Aug. 11, 1942 |
| 2,695,103 | Armstrong | Nov. 23, 1954 |
| 2,963,530 | Hanks et al. | Dec. 6, 1960 |